(12) United States Patent
Collins

(10) Patent No.: US 11,853,085 B2
(45) Date of Patent: Dec. 26, 2023

(54) ACTUATOR FOR A PILOT VALVE

(71) Applicant: OFIP LIMITED, Oxford (GB)

(72) Inventor: Matthew Collins, Oxford (GB)

(73) Assignee: OFIP LIMITED, Oxford (GB)

( * ) Notice: Subject to any disclaimer, the term of this patent is extended or adjusted under 35 U.S.C. 154(b) by 0 days.

(21) Appl. No.: 17/616,513

(22) PCT Filed: May 28, 2020

(86) PCT No.: PCT/GB2020/051284
§ 371 (c)(1),
(2) Date: Dec. 3, 2021

(87) PCT Pub. No.: WO2020/245565
PCT Pub. Date: Dec. 10, 2020

(65) Prior Publication Data
US 2022/0229452 A1    Jul. 21, 2022

(30) Foreign Application Priority Data
Jun. 6, 2019  (GB) .................................. 1908093

(51) Int. Cl.
*F16K 31/122* (2006.01)
*G05D 16/06* (2006.01)
*F16K 31/124* (2006.01)

(52) U.S. Cl.
CPC ....... *G05D 16/0661* (2013.01); *F16K 31/124* (2013.01); *F16K 31/1221* (2013.01)

(58) Field of Classification Search
CPC ............ G05D 16/2024; G05D 16/0661; F16K 31/124; F16K 31/1221
See application file for complete search history.

(56) References Cited

U.S. PATENT DOCUMENTS 962,736 A * 6/1910 Bice .................... F16K 31/1221
251/63.4
1,859,089 A * 5/1932 Holmes .............. G05D 16/0661
137/505.44

(Continued)

FOREIGN PATENT DOCUMENTS

DE   102006053457 A1   11/2007
GB         1306679 A    2/1973
JP       2002099331 A    4/2002

OTHER PUBLICATIONS

International Search Report (Form PCT/ISA/210) for International Application No. PCT/GB2020/51284 dated Aug. 13, 2020, 4 pages.

(Continued)

*Primary Examiner* — Umashankar Venkatesan
(74) *Attorney, Agent, or Firm* — Withrow & Terranova, P.L.L.C.; Vincent K. Gustafson

(57) ABSTRACT

An actuator for a pilot valve, including a housing, a piston movably mounted in the housing and an actuator chamber defined between the piston and the housing. The actuator includes a control fluid feed for introducing a fluid into the actuator chamber to control fluid pressure, with the fluid pressure acting on the piston. The actuator also includes an actuation member for acting on the pilot valve and a loading spring between the piston and the actuation member. The loading spring is arranged to bias the piston against the fluid pressure in the actuator chamber. The control fluid feed controls the fluid pressure so the fluid pressure acts on the piston against the bias of the loading spring to control the biasing force.

13 Claims, 3 Drawing Sheets

(56) References Cited

U.S. PATENT DOCUMENTS

| | | | | |
|---|---|---|---|---|
| 3,086,548 | A * | 4/1963 | Galiger | G05D 16/02 |
| | | | | 239/602 |
| 3,825,029 | A * | 7/1974 | Genbauffe | F16K 31/365 |
| | | | | 137/271 |
| 4,809,733 | A * | 3/1989 | Hawkins | F16K 31/1221 |
| | | | | 92/60 |
| 6,135,142 | A * | 10/2000 | Yokota | F16K 31/124 |
| | | | | 137/486 |
| 6,935,362 | B1 | 8/2005 | Yonnet | |
| 7,082,963 | B2 * | 8/2006 | Ando | G05D 16/0661 |
| | | | | 137/505.39 |
| 10,378,671 | B2 * | 8/2019 | Johnson | F16K 39/02 |
| 10,443,748 | B2 * | 10/2019 | Lei | F16K 17/04 |
| 11,441,580 | B2 * | 9/2022 | Kurata | G05D 16/2024 |
| 2002/0036013 | A1 * | 3/2002 | Inayama | G05D 16/2024 |
| | | | | 137/487.5 |
| 2003/0070710 | A1 * | 4/2003 | Inayama | G05D 16/2095 |
| | | | | 137/85 |
| 2017/0227134 | A1 | 8/2017 | Tuineag | |

OTHER PUBLICATIONS

Written Opinion (Form PCT/ISA/237) for International Application No. PCT/GB2020/51284 dated Aug. 13, 2020, 7 pages.

Search Report under Section 17(5) for United Kingdom Patent Application No. GB1908093.6 dated Nov. 13, 2019, 3 pages.

CLA-VAL CRD-34 & CRA-34 Electronic Actuated Pressure Reducing Pilot Control Marketing Sheet [retrieved on Dec. 3, 2021]. Retrieved from the Internet:<URL:https://www.cla-val.co.uk/wp-content/uploads/2020/11/C RD341DE.pdf>, 2 pages.

\* cited by examiner

ACTUATOR FOR A PILOT VALVE

This application is a 35 U.S.C. § 371 national phase filing of International Application No. PCT/GB2020/051284, filed on May 28, 2020 and claims the benefit of United Kingdom Patent Application No. 1908093.6, filed on Jun. 6, 2019, wherein the entire contents of the foregoing applications are hereby incorporated by reference herein.

The present invention relates to an actuator for a pilot valve, in particular to a spring loaded actuator suitable for acting against a diaphragm of a pilot valve.

Pilot valves may be used in fluid control systems to regulate the supply of control fluid to control valves and pressure regulator devices. Typically small in size and easily operable, pilot valves are able to control the operation of much larger valves, such as control valves or pressure regulators, the actuation of which would otherwise require much greater force.

A pilot valve may include a diaphragm and poppet assembly which is moved between an open position, in which fluid may flow through the pilot valve, and a closed position, in which the flow of fluid is restricted. Pilot valves may be used to enable a number of different control strategies. This may include the control of the pressure downstream of a control valve or pressure regulator (commonly referred to as pressure reducing) and the control of the pressure upstream of a control valve (commonly referred to as pressure sustaining).

In a pressure reducing pilot valve, the pressure downstream of the pilot valve acts on the diaphragm against the force of a loading spring. The force exerted by the loading spring on the pilot diaphragm may be adjusted by compressing or decompressing the loading spring. This determines the set target pressure, or setpoint, of fluid flowing out of the pilot valve.

If the downstream pressure exceeds the setpoint, the force from the downstream pressure acting on the diaphragm will be greater than the opposing force of the loading spring such that the diaphragm and poppet will be biased to restrict flow through the pilot valve. The reduction in flow through the pilot valve results in a change of the control pressure transmitted to the control valve or pressure regulator to which the pilot valve is fluidly connected. In turn, this causes the control valve or pressure regulator to close, which acts to reduce the flow through the control or pressure regulator and subsequently reduce the downstream pressure.

Conversely, if the downstream pressure is less than the setpoint, the force of the loading spring on the diaphragm will be greater than the opposing force from the downstream pressure acting on the diaphragm, such that the diaphragm and poppet will be biased to increase flow through the pilot valve. The increase in flow of the control fluid through the pilot valve results in a change of the control pressure transmitted to the control valve or pressure regulator. In turn, this causes the control valve or pressure regulator to open, which acts to increase the flow through the control or pressure regulator and subsequently increase the downstream pressure.

The setpoint may be adjusted by compressing or decompressing the loading spring using an actuator, thereby respectively increasing or decreasing the biasing force acting on the diaphragm and poppet arrangement.

FIG. 1 shows such an actuator 41 that includes an adjustment bolt 42 arranged at the end of the loading spring 43 such that, when the bolt 42 is rotated, the loading spring 43 is compressed or decompressed. The compression of the loading spring 43 exerts a biasing force on the pilot diaphragm 44 and poppet 45 of the pilot valve 46 which may be adjusted to determine the desired setpoint. This approach may not allow for precise or remote control of the pilot valve setpoint.

Alternatively, an actuator may include an actuator diaphragm to which a control pressure is supplied via the flow of fluid from a control source through a flexible hose. The force generated by this control pressure is transmitted from the actuator diaphragm to the loading spring via a pin, thus causing the loading spring to compress. The compression of the loading spring exerts a force on the pilot diaphragm and poppet, thereby acting to bias the pilot valve in order to control the setpoint.

It will be appreciated that the above solution is complex and has multiple failure points. For example, actuator diaphragms are prone to cracking, resulting in leakage of control fluid and a corresponding loss in pressure. This can significantly reduce the efficiency of the valve. Furthermore, the limited travel of the actuator diaphragm and pin arrangement means that the range of compression of the loading spring is restricted, thereby limiting the range of setpoints available.

Additionally, the flexible hose that connects the control fluid source to the diaphragm is often a significant source of leakage and loss of pressure.

The present invention aims to provide an improved actuator for a pilot valve.

When viewed from a first aspect, the invention provides an actuator for a pilot valve, the actuator comprising:
a housing;
a piston movably mounted in the housing;
an actuator chamber defined between the piston and the housing;
a control fluid feed for introducing a fluid into the actuator chamber to selectively control a fluid pressure in the actuator chamber, wherein the piston is arranged to be acted on by the fluid pressure in the actuator chamber;
an actuation member for acting on the pilot valve; and
a loading spring between the piston and the actuation member, wherein the loading spring is arranged to bias the piston against the fluid pressure in the actuator chamber;
wherein the control fluid feed is arranged to control the fluid pressure in the actuator chamber so the fluid pressure acts on the piston against the bias of the loading spring to control the biasing force exerted by the loading spring on the actuation member for actuating the pilot valve.

The present invention provides an actuator for a pilot valve that may thus allow the setpoint of the pilot valve to be adjusted. The setpoint of the pilot valve is controlled by controlling the compression of a loading spring, which extends between a piston and an actuation member (which is arranged to act on the (e.g. diaphragm of the) pilot valve), to exert a biasing force on the actuation member.

The piston is mounted within a housing which, together with the piston, defines an actuator chamber. The chamber is fluidly connected to a control fluid feed that allows the fluid pressure within the chamber to be selectively controlled. The fluid pressure acts on the piston against the bias of the loading spring. Thus, an increased pressure in the actuator chamber acts on the piston to compress the loading spring.

Controlling the fluid pressure in the actuator chamber thus controls the compression of the loading spring which, in turn, controls the biasing force that the actuating member is able exert on the (e.g. diaphragm of the) pilot valve. This enables the fluid pressure in the actuator chamber to be used to control actuation of a pilot valve, e.g. depending on the pressure in the pilot valve the opposite side of the diaphragm.

It will be appreciated that providing a piston in an actuator, e.g. instead of a diaphragm and pin arrangement, helps the actuator of the present invention to provide a wider (and potentially more sensitive) range of setpoints for the pilot valve owing to the potentially greater range of travel of the piston than the limited range of a diaphragm. Furthermore, a piston does not flex in the same manner as a diaphragm and so may not be subject to cracking and the resultant loss of fluid pressure, thus helping to improve the reliability of the actuator.

The housing of the actuator may have any suitable and desirable form, in order to mount the piston and, with the piston, define the actuator chamber. Preferably the housing is cylindrical (e.g. having an axis along which the cylinder extends in a direction parallel to the direction in which the piston is able to move). Preferably the housing defines an inner volume (e.g. a void) and the piston is mounted in the inner volume of the housing. Thus, preferably the housing comprises an (e.g. cylindrical) outer wall defining the inner volume and, for example, the piston is mounted on the (e.g. inner surface) of the outer wall of the housing. Preferably the actuator chamber comprises a portion of the inner volume of the housing.

The housing may be made from any suitable and desired material. In one embodiment the housing is made from metal, e.g. stainless steel. In one embodiment the housing is made from plastic.

The piston may be movably mounted in the housing in any suitable and desired way. Preferably the piston is cylindrical (e.g. having an axis along which the cylinder extends in a direction parallel to the direction in which the piston is able to move), e.g. to complement the cylindrical housing in which it is mounted.

Preferably the piston comprises a piston head arranged to be acted on by the fluid pressure in the actuator chamber. Thus, preferably the actuator chamber is defined between the piston head and the housing. Preferably the piston head is cylindrical (e.g. disc-shaped).

Preferably the piston comprises a piston shaft. Preferably the loading spring is (mounted) between the piston shaft and the actuation member. Preferably the piston shaft comprises a recess, e.g. the piston shaft comprises an internal volume, to receive the loading spring. Thus, preferably the piston shaft comprises a hollow cylinder.

Preferably the piston head is wider (e.g. has a greater diameter) than the piston shaft, in a direction perpendicular to the direction in which the piston is able to move. Thus, preferably the housing defines an inner volume comprising a first inner volume portion (distal from the actuation member) and a second inner volume portion (proximal to the actuation member), wherein the first inner volume portion is wider (e.g. has a greater diameter) than the second inner volume portion, in a direction perpendicular to the direction in which the piston is able to move, and wherein the piston head is movably mounted in the first inner volume portion (e.g. on the inner surface of the wall of the first inner volume portion) and the piston shaft is movably mounted at least partly in the second inner volume portion (e.g. on the inner surface of the wall of the second inner volume portion).

Preferably the actuator chamber comprises a portion of the first inner volume portion. Preferably the loading spring extends at least partly through the second inner volume portion. Thus, preferably the loading spring is mounted in the housing, e.g. the housing comprises a spring case.

Preferably the housing is arranged to mount the actuator to the pilot valve. Thus, preferably the housing extends from the actuator chamber (e.g. from the control fluid feed, e.g. from the inlet and outlet conduits and/or valves) to the pilot valve. Preferably the actuation member is mounted in the housing.

The piston may be made from any suitable and desired material. In one embodiment the piston is made from metal, e.g. stainless steel. In one embodiment the piston is made from plastic.

The actuator chamber, which is defined between the piston (e.g. the piston head) and the (e.g. first inner volume portion of the) housing, preferably comprises a seal between the piston and the housing, e.g. to (substantially) prevent the leakage of fluid from the actuator chamber (e.g. to the other side of the piston). The seal may be provided in any suitable and desired way. Preferably the seal is between the piston head and the (e.g. inner surface of the wall of the) housing. Preferably the seal is located in a (e.g. circumferentially extending) groove defined in the piston (e.g. in the piston head). Preferably the seal comprises an O-ring. In one embodiment the seal comprises an elastomer, e.g. nitrile, seal. In one embodiment the seal comprises polytetrafluoroethylene (PTFE) or polyurethane.

As will be appreciated, the volume of the actuator chamber varies as the piston moves in response to changes in the fluid pressure in the actuator chamber (under the control of the control fluid feed). Preferably the housing is arranged to define the maximum and minimum volumes of the actuator chamber. Preferably the housing comprises a stop (e.g. a shoulder, e.g. at the boundary between the first inner volume portion and the second inner volume portion) for the piston (e.g. the piston head). Preferably the stop defines a position of the piston (e.g. the piston head) at which the actuator chamber has a maximum volume, e.g. at the maximum distance of travel of the piston.

In a preferred embodiment (e.g. when the actuator chamber is sealed, to prevent leakage of the control fluid to the other side of the piston (e.g. into the second inner volume portion)), the second inner volume portion is arranged at atmospheric pressure. This may be done in any suitable and desired way. For example, the housing may comprise an aperture in the (wall of the) housing, e.g. from the second inner volume portion to atmosphere.

The fluid that is used in the actuator chamber may be any suitable and desired fluid. Preferably the fluid comprises an incompressible fluid, e.g. an incompressible liquid such as water or oil, or a gas such as air.

The fluid may be provided from any suitable and desired (e.g. pressurised fluid) source; preferably the control fluid feed is fluidly connected to a fluid source for supplying the fluid into the actuator chamber. In one embodiment the fluid is supplied from a separate (e.g. pressurised) fluid source. In a preferred embodiment the fluid is drawn from the working fluid that flows through the fluid flow control device (e.g. control valve or pressure regulator) that the pilot valve being controlled by the actuator is controlling. Thus, preferably the control fluid feed is fluidly connected to (e.g. the upstream side of) a pipeline in which a fluid flow control device controls the flow of fluid through the pipeline, wherein the fluid flow control device is controlled by a pilot valve whose setpoint is controlled by the actuator of the present invention.

The fluid may be introduced into the actuator chamber by the control fluid feed in any suitable and desired way. In a preferred embodiment the control fluid feed comprises an inlet valve for controlling the flow of fluid into the actuator chamber (e.g. through an inlet conduit) and an outlet valve for controlling the flow of fluid out of the actuator chamber (e.g. through an outlet conduit). Thus preferably the control fluid feed comprises an inlet conduit and an outlet conduit (each fluidly connected to the actuator chamber). Preferably the inlet conduit is fluidly connected to the (e.g. pressurised) fluid source. Preferably the outlet conduit is arranged to vent the fluid that is allowed to flow out of the actuator chamber, e.g. to atmosphere.

It will be appreciated that by actuating the inlet valve, the control fluid feed is able to supply fluid into the actuator chamber to pressurise the actuator chamber, thus acting on the piston against the bias of the loading spring to move the piston (i.e. by increasing the volume of fluid in the actuator chamber) so to compress the loading spring, thus increasing the force on the actuation member. By actuating the outlet valve, the control fluid feed is able to allow fluid out of the actuator chamber to depressurise the actuator chamber, thus reducing the force from the pressurised fluid against the bias of the loading spring so to allow the piston to move away from the (e.g. diaphragm of the) pilot valve (i.e. by decreasing the volume of fluid in the actuator chamber) so to decompress the loading spring, thus decreasing the force on the actuation member.

Preferably the inlet valve and the outlet valve are arranged (e.g. in their closed position) to seal the actuation chamber (e.g. by sealing the inlet conduit and the outlet conduit). Thus it will be appreciated that, in at least preferred embodiments, the control fluid feed may only need to operate (e.g. the inlet and outlet valves be actuated) when the fluid pressure in the actuation chamber is desired to be varied. In between, the actuation chamber is preferably arranged to retain its fluid pressure.

Preferably the inlet conduit and the outlet conduit are integrally formed in the housing. This helps to reduce leakage of the fluid from the actuator (e.g. in contrast to conventional actuators in which the control fluid may be supplied via flexible hoses that are prone to leaking). In turn this helps to reduce the number of times that the inlet valve and the outlet valve have to be actuated, e.g. to maintain the fluid pressure in the actuation chamber. This therefore helps to reduce the power consumption of the inlet and outlet valves and helps to increase the operational lifetime of the inlet and outlet valves, which, e.g., may have a lifetime of a finite number of actuations.

The inlet valve and the outlet valve may be operated in any suitable and desired way. Preferably the inlet valve and the outlet valve are connected to a power supply, e.g. wired to a mains power supply. In one embodiment the actuator comprises a battery power supply for supplying power to the inlet valve and the outlet valve. When the actuator comprises a battery power supply, it will be appreciated that reducing the leakage of fluid from the actuator helps to increase the lifetime of the battery power supply.

The inlet and outlet valves may comprise any suitable and desired valves. In a preferred embodiment the inlet valve comprises an inlet solenoid valve and/or the outlet valve comprises an outlet solenoid valve. Preferably the inlet solenoid valve comprises an inlet direct-acting solenoid valve. Preferably the outlet solenoid valve comprises an outlet direct-acting solenoid valve. Thus preferably the inlet solenoid valve is actuated (e.g. pulsed) to allow fluid into the actuator chamber and preferably the outlet solenoid valve is actuated (e.g. pulsed) to allow fluid out of the actuator chamber.

Preferably the inlet (e.g. solenoid) valve and/or the outlet (e.g. solenoid) valve are directly (e.g. integrally) mounted on the housing. Preferably the inlet (e.g. solenoid) valve and/or the outlet (e.g. solenoid) valve are arranged to act directly on (open and close) the inlet conduit and the outlet conduit respectively, e.g. which are integrally formed in the housing. This helps, e.g. along with the integrally formed inlet conduit and outlet conduit, to reduce leaks of the control fluid from the actuator. This is because, in these embodiments, it is not necessary for the (e.g. solenoid) valves to be connected to the actuator via flexible hoses (as may be provided in conventional actuators) that are prone to leaking.

Preferably the inlet (e.g. solenoid) valve and the outlet (e.g. solenoid) valve are biased closed (such that the inlet conduit and the outlet conduit are both sealed closed to seal the actuator chamber), e.g. by a respective spring. Preferably the inlet valve and the outlet valve are arranged to remain in, or move into, the closed position when the inlet valve and/or the outlet valve fail (or there is a loss of power thereto). This helps to retain the actuator (and thus the pilot valve) in the same position when the inlet valve and/or the outlet valve fail (or there is a loss of power thereto), thus helping, for example, to avoid a loss of control pressure from the pilot valve (which may, for example, cause the fluid flow control device being controlled by the pilot valve to fully open or close).

The loading spring, which is located between the piston (e.g. piston head) and the actuation member, is preferably a compression spring, e.g. a helical compression spring or a flat wire compression spring. Preferably, the loading spring is arranged to extend between the piston head and the actuation member, e.g. from the first inner volume portion into the second inner volume portion of the housing. Preferably the end of the loading spring that is distal to the actuation member (e.g. within the first inner volume portion) is located at least partly within the internal volume (e.g. hollow cylinder) of the piston shaft.

The other end of the loading spring is arranged to abut the actuation member. Preferably the (e.g. base of the) housing comprises an aperture through which the loading spring extends, so that it is able to act on the actuation member. Preferably the actuation member comprises a (e.g. annular) groove for receiving the loading spring. Thus this end of the loading spring is located by the annular groove in the actuation member. As the moving parts of the actuator (e.g. the piston) are separated from the pilot poppet and diaphragm by way of the loading spring, no additional frictional forces are added to the main control elements of the pilot valve.

The actuation member may be provided in any suitable and desired way. Preferably the actuation member is arranged between the loading spring and the (e.g. pilot poppet of the) pilot valve. Thus movement of the actuation member (e.g. as a result of the relative force of the loading spring and the fluid pressure in the pilot valve) actuates the (e.g. pilot poppet of the) pilot valve. In one embodiment the actuation member comprises a plate. In one embodiment the actuation member comprises a diaphragm. Providing a diaphragm helps to seal the fluid being controlled through the pilot valve from the (e.g. second inner volume portion of the) actuator. A diaphragm also helps to provide a (relatively large) surface area for the fluid pressure of the pilot valve to act against, opposing the force from the loading spring.

In a preferred embodiment the actuation member comprises a diaphragm and a diaphragm plate. Preferably the actuation member acts directly against the (diaphragm) plate to bias the diaphragm against the fluid pressure in the pilot valve (and, e.g., the spring force of the pilot poppet).

The invention also extends to a system for controlling the setpoint of a pilot valve, wherein the system comprises:
a pilot valve; and
an actuator for acting on the pilot valve, the actuator comprising:
a housing;
a piston movably mounted in the housing;
an actuator chamber defined between the piston and the housing;
a control fluid feed for introducing a fluid into the actuator chamber to selectively control a fluid pressure in the actuator chamber, wherein the piston is arranged to be acted on by the fluid pressure in the actuator chamber;
an actuation member for acting on the pilot valve; and
a loading spring between the piston and the actuation member, wherein the loading spring is arranged to bias the piston against the fluid pressure in the actuator chamber;
wherein the control fluid feed is arranged to control the fluid pressure in the actuator chamber so the fluid pressure acts on the piston against the bias of the loading spring to control the biasing force exerted by the loading spring on the actuation member for actuating the pilot valve. Thus the actuator is arranged to control the biasing force exerted by the loading spring on the actuation member for controlling the setpoint of the pilot valve.

Preferably the pilot valve comprises an inlet conduit and an outlet conduit, and a pilot valve member, wherein the pilot valve member is acted on by the actuation member of the actuator to selectively control the flow of fluid from the inlet conduit to the outlet conduit of the pilot valve. The control pressure for a control valve or pressure regulator may be taken from either the upstream or downstream side of the pilot valve.

In some embodiments the actuator comprises a secondary spring that extends between the housing and the piston, e.g. within the second inner volume portion of the housing. Thus, preferably the secondary spring is mounted in the housing. Preferably the secondary spring is arranged to bias the piston against the fluid pressure in the actuator chamber.

Providing a secondary spring acts to reduce the force transmitted through the pilot loading spring and may be used to compensate for friction within the piston assembly. This may help to allow the setpoint of the pilot valve to be set to zero. This is because the secondary spring opposes the frictional force and weight of the piston by acting on the housing rather than the actuation member (which the primary, loading spring does). Thus, when the fluid pressure in the actuator chamber is reduced to atmospheric pressure, the second spring helps to reduce the force transmitted through the loading spring to the actuation member, e.g. such that the loading spring is not compressed. Setting the setpoint to zero may allow the pilot valve to be fully closed as the forces acting through the loading spring may be negated.

Preferably, the secondary spring surrounds (e.g. is located radially outwards of) the loading spring. Preferably the secondary spring (i.e. the end that is proximal to the actuation member) is mounted upon an inwardly protruding rim (e.g. at the base) of the housing, e.g. around the aperture through which the loading spring acts on the actuation member. The other end of the secondary spring (distal from the actuation member) preferably abuts the piston (e.g. the base of the piston shaft).

The secondary spring may comprise any suitable and desired type of spring. Preferably the secondary spring comprises a compression spring, e.g. a flat wire compression spring or a helical compression spring.

The control fluid feed is arranged to control the fluid pressure in the actuator chamber so the fluid pressure acts on the piston against the bias of the loading spring (and, e.g., the secondary spring). Increasing the flow of fluid into the actuator chamber increases the pressure acting on the actuator piston, while venting fluid out of the actuator chamber decreases the pressure acting on the actuator piston. This control fluid feed therefore controls the displacement of the actuator piston, thereby controlling the preload of the loading spring, thus allowing the setpoint of the pilot valve to be controlled.

In some embodiments, the control fluid feed (e.g. inlet and outlet valves (e.g. solenoids)) may be connected (e.g. provide feedback) to a control unit. This may be, for example, via a wireless or wired connection. Thus, the actuator may be operated remotely via the control unit, either manually or automatically (e.g. as part of a feedback loop).

In some embodiments, the fluid flow control device (e.g. control valve or pressure regulator) being controlled by the pilot valve that is actuated by the actuator of the present invention may have one or more of its operating parameters (e.g. upstream and/or downstream pressure, fluid flow rate through the device, valve member position, control volume pressure, pilot valve pressure) monitored. The respective sensor(s) measuring these operating parameter(s) are preferably connected (e.g. provide feedback) to the control unit.

Preferably the actuator is operated, via the control unit, based on the operating parameter(s) of the fluid flow device. This helps to allow the fluid flow device to be controlled more precisely.

As, in at least preferred embodiments, the piston has a greater range of travel than a traditional diaphragm, the present invention may be capable of operating over a wider range of pressures than conventional actuators. For example, while typical systems involving a diaphragm actuator are capable of modulating the pilot valve setpoint between 2 bar and 4 bar, certain embodiments of the present invention may achieve modulation of the setpoint pressures within the range of 0 bar to 7 bar.

A preferred embodiment of the invention will now be described, by way of example only, with reference to the accompanying drawings in which.

A pilot valve may be used in a fluid control system in order to control a higher pressure and/or a higher flow rate fluid flow control device (e.g. a control valve or pressure regulator). The use of a pilot valve is beneficial as it is typically smaller and more easily operated than the larger downstream device, the actuation of which would otherwise require much greater force. A pilot valve is itself typically controlled by an actuator which allows the set target pressure, or setpoint, of the pilot valve to be determined.

Figure 1:
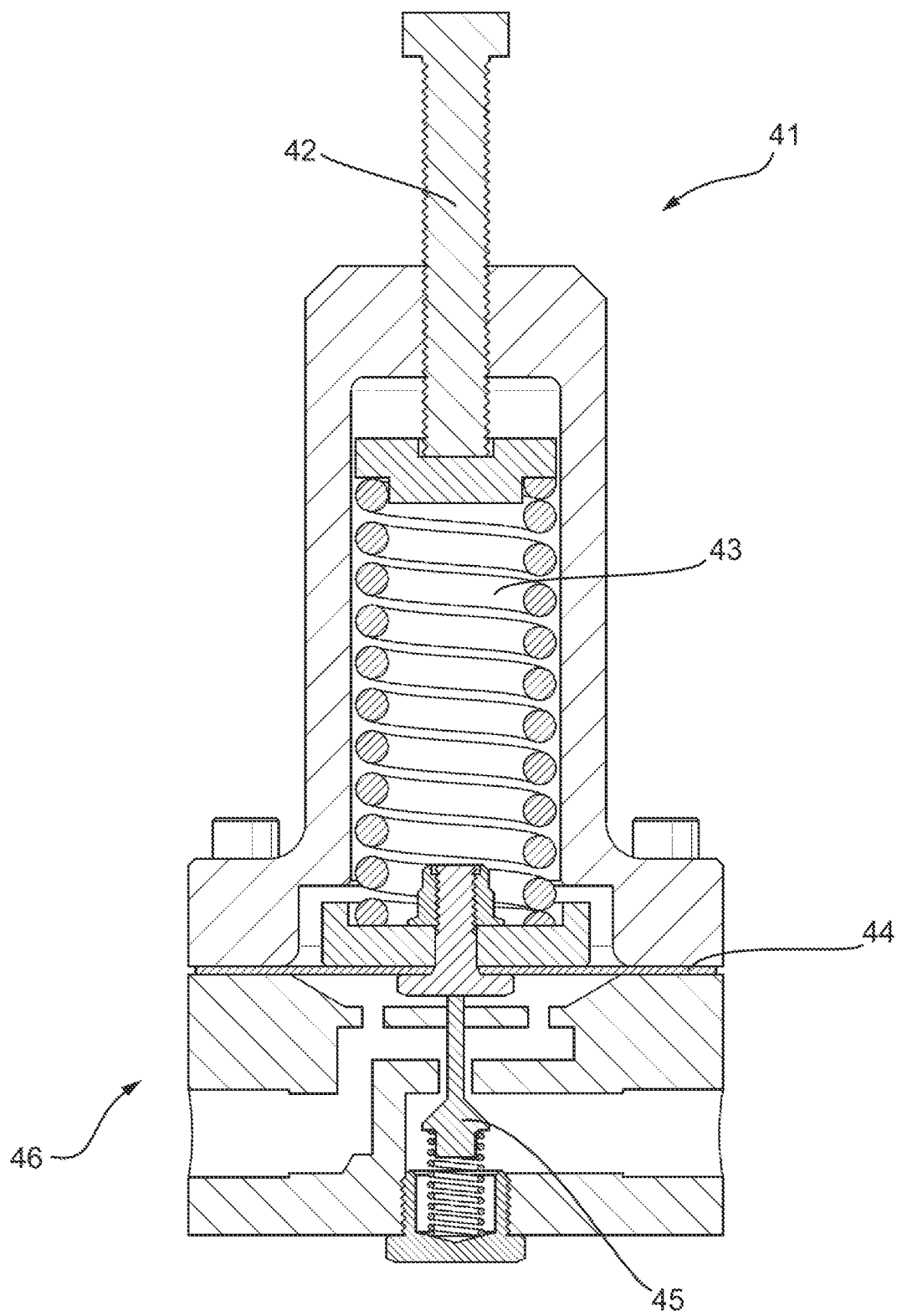
FIG. 1 shows a conventional actuator for a pilot valve.
Figure 2:
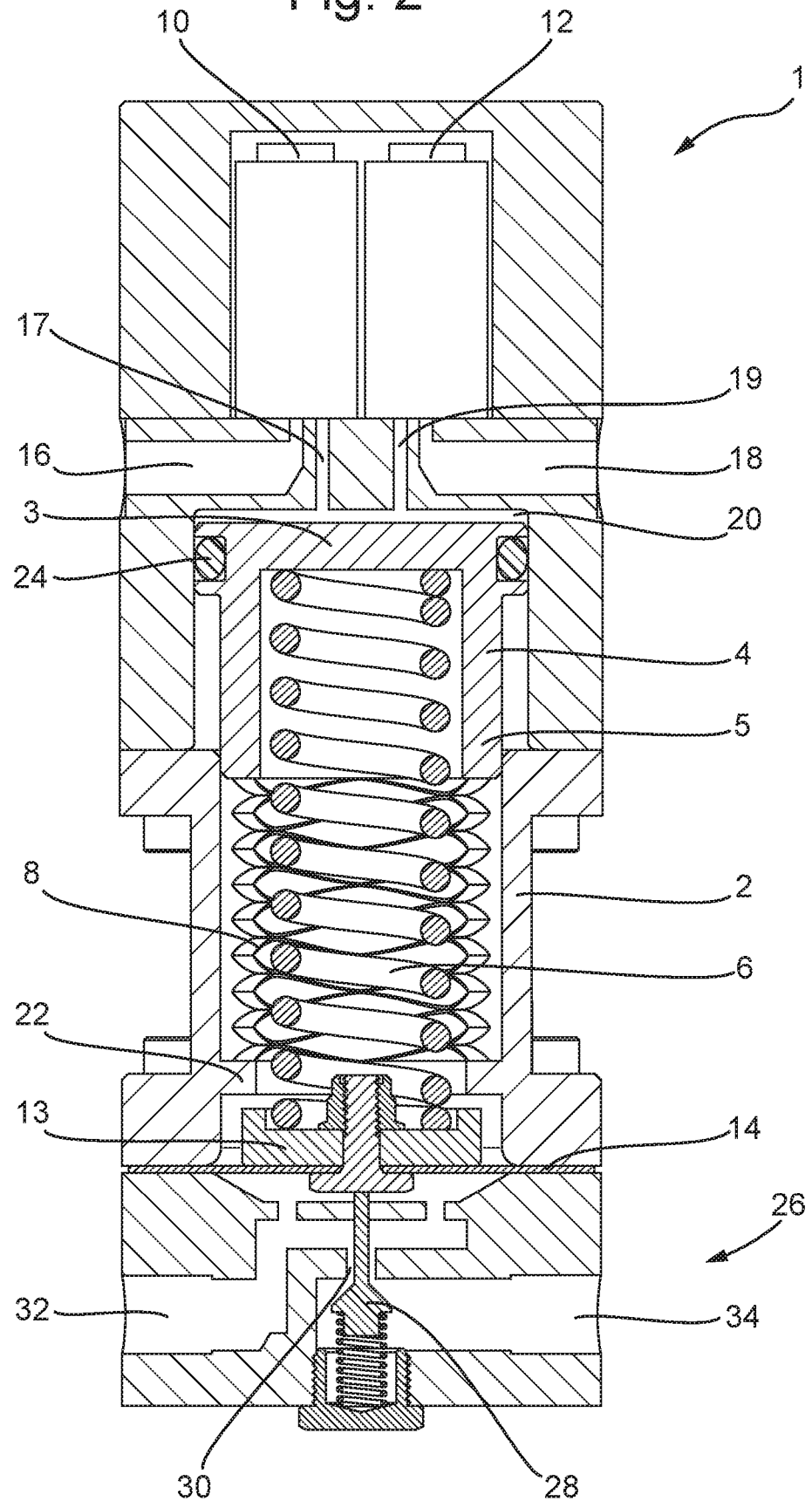
FIGS. 2 and 3 show cross-sectional views of an actuator for a pilot valve in accordance with an embodiment of the present invention.
Figure 3:
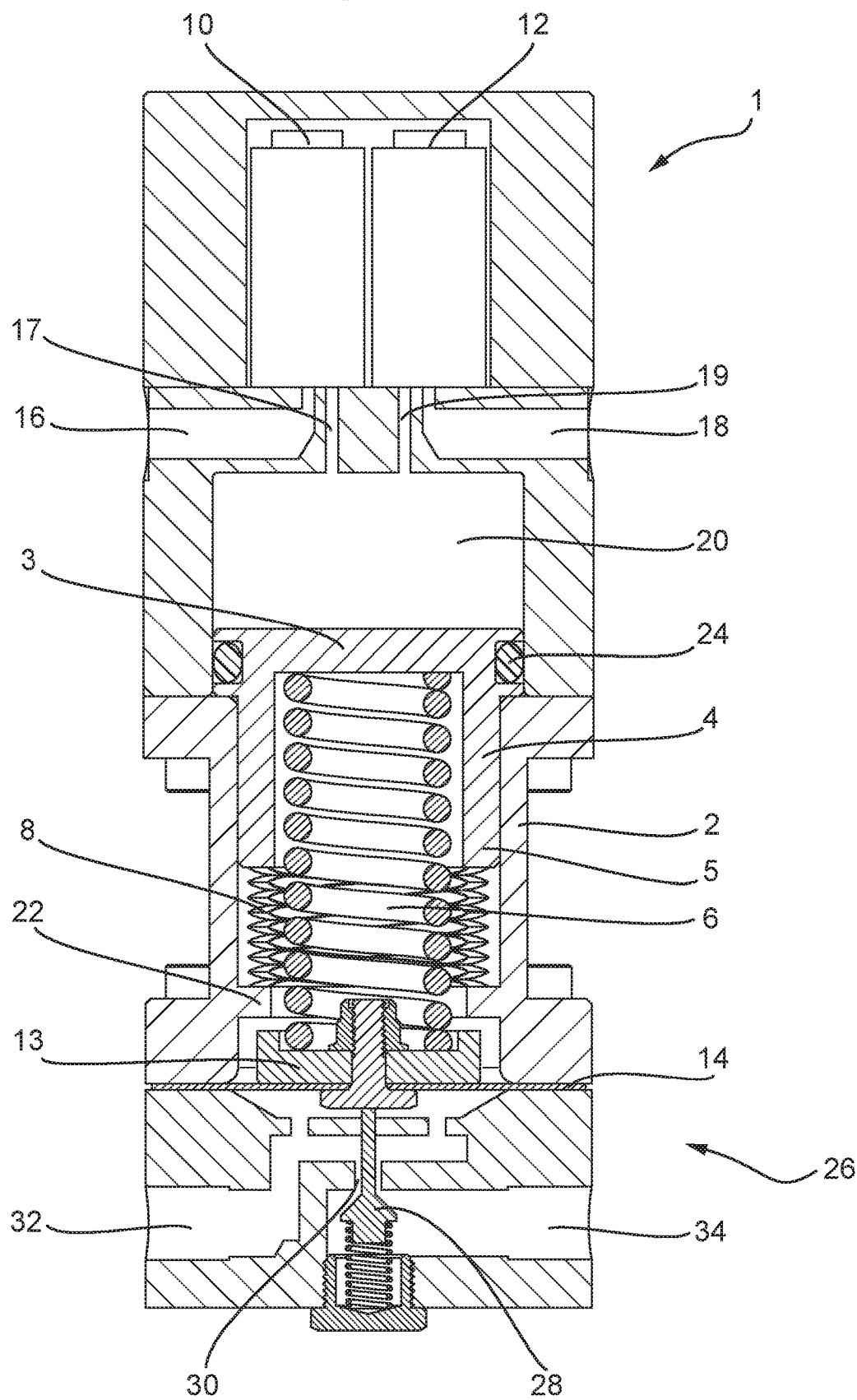

FIG. 2 shows a cross-sectional view of an actuator 1 for a pressure reducing pilot valve in accordance with an embodiment of the invention, where the setpoint of the pilot valve is at a minimum value. FIG. 3 shows a cross-sectional view of the actuator 1 where the setpoint of the pilot valve is at a maximum value.

As illustrated in FIGS. 2 and 3, a typical pilot valve 26 may comprise a diaphragm 14 from which a poppet 28 extends perpendicularly through an aperture 30, which fluidly connects an inlet pilot flow feed 32 to an outlet pilot flow feed 34. The pilot valve 26 may be connected to a fluidic control system which, in turn, controls a higher pressure and/or higher flow rate fluid control device (e.g. control valve or pressure regulator).

For a pressure reducing pilot valve, the pressure of the pilot flow downstream of the aperture 30 acts upwards on the underside of the diaphragm 14. This is opposed by a downwards force exerted on the upper side of the diaphragm 14 by a loading spring 6 via an actuation member 13 (i.e. a diaphragm plate).

The force exerted by the loading spring 6 on the pilot diaphragm 14 via the diaphragm plate 13 may be adjusted by compressing or decompressing the loading spring 6. This determines the set pressure, or setpoint, of the pilot valve 26. If the downstream pressure acting on the underside of the pilot diaphragm 14 exceeds the setpoint, the force acting upwards on the underside of the diaphragm 14 will be greater than the downwards force of the loading spring 6 acting on the diaphragm 14 via the diaphragm plate 13. Consequently, the diaphragm 14 will be forced upwards, causing the poppet 28 to rise such that the pilot aperture 30 is effectively narrowed and flow through the aperture 30 and the outlet pilot flow feed 34 is restricted. The reduction in flow through the outlet pilot flow feed 34 results in a change of the control pressure transmitted to the control valve or pressure regulator to which the pilot valve 26 is fluidly connected. This in turn causes the control valve/pressure regulator to close, which acts to reduce the flow through the control valve and subsequently reduce the downstream pressure.

Conversely, if the downstream pressure is below the setpoint, the downwards force of the loading spring 6 acting on the diaphragm 14 via the diaphragm plate 13 will be greater than the upwards force of the downstream pressure acting on the underside of the diaphragm 14. Consequently, the diaphragm 14 will be forced downwards, causing the poppet 28 to be lowered such that the pilot aperture 30 is effectively widened and flow through the aperture 30 and the outlet pilot flow feed 34 is increased. The increase in flow through the outlet pilot flow feed 34 results in a change of the control pressure transmitted to the control valve or pressure regulator to which the pilot valve 26 is fluidly connected. This in turn causes the control valve or pressure regulator to open which acts to increase the flow through the control valve and subsequently increase the downstream pressure.

The setpoint of pilot valves may be set in this way via the actuator 4 which compresses and decompresses the loading spring 6. As will now be described, embodiments of the present invention aim to provide an improved actuator for a pilot valve.

FIG. 2 shows a cross-sectional view of an actuator 1 mounted upon a pilot valve 26, as described above, wherein the setpoint of the pilot valve 26 is at a minimum value. The actuator 1 comprises a housing 2, an actuator piston 4, an inlet solenoid 10 and an outlet solenoid 12. The housing 2 defines a control fluid inlet feed 16 and a control fluid outlet feed 18. The housing 2 and the actuator piston 4 together define an actuator chamber 20. The control fluid inlet feed 16 and control fluid outlet feed 18 are fluidly connected to the actuator chamber 20 via inlet and outlet channels 17 and 19 respectively. Flow through the inlet channel 17 is controlled by the inlet solenoid 10 and flow through the outlet channel 19 is controlled by the outlet solenoid 12. The inlet and outlet solenoids 10, 12 open and close to control the flow of fluid into and out of the actuator chamber 20.

The inlet and outlet solenoids 10, 12 are directly integrated into the pilot housing 2, thus minimising the number of potential leak points from the actuator chamber 20. This also has the advantage of reducing power consumption and increasing the lifetime of the inlet and outlet solenoids 10, 12, as they are required to fire less frequently in order to replace any control fluid that may have leaked from the actuator chamber 20.

The control fluid inlet feed 16 is fluidly connected to the upstream flow of the working fluid in the fluid flow control device such that it receives fluid to generate a fluid pressure that acts on the actuator piston 4. The control fluid pressure is greater than or equal to the pressure of the fluid flowing through the pilot aperture 30. The control fluid outlet feed 18 is fluidly connected to atmosphere so that fluid and pressure may be vented from the actuator chamber 20. The inlet solenoid 10 and outlet solenoid 12 are sprung closed but are able to be independently pulsed open to allow control fluid to flow into or out of the actuator chamber 20 respectively. Increasing the flow of fluid into the actuator chamber 20 increases the pressure acting on the actuator piston 4, while venting fluid out of the actuator chamber decreases the pressure acting on the actuator piston 4.

The inlet solenoid 10 and outlet solenoid 12 may be operated via a control system. The control system may also receive feedback from sensors that measure parameters of the fluid flow control device (e.g. pressure, flow rate) and which may be used to determine the setpoint of the pilot valve 26.

The actuator piston 4 and pilot diaphragm 14 are located within an inner volume of the housing 2. The actuator piston 4 comprises a circular piston head 3 and a hollow cylindrical piston shaft 5 that extends perpendicularly from the inner surface of the piston head 3. A loading spring 6 is positioned within the piston shaft 5 and extends between the actuator piston 4 and a diaphragm plate 13, which is mounted to the diaphragm 14 such that vertical displacement of the actuator piston 4 exerts a force on the diaphragm 14 via the loading spring 6 and the diaphragm plate 13.

The setpoint of the diaphragm 14 is selectively increased and decreased by respectively increasing and decreasing the force exerted by the loading spring 6 on the diaphragm 14 via the diaphragm plate 13, i.e. by increasing or decreasing the fluid pressure in the actuator chamber 20.

As the actuator piston 4 is isolated from the diaphragm 14 and poppet 28 via the loading spring 6, friction resulting from movement of the actuator piston 4 may not have a negative effect on the performance of the pilot valve 26.

The actuator piston 4 is movable between a resting position (shown in FIG. 2) and a fully depressed position (shown in FIG. 3) and is sealed within the housing 2 by an actuator piston seal 24, which prevents control fluid from leaking out of the actuator chamber 20.

The housing 2 further comprises an inwardly protruding rim 22 which projects into the central bore of the housing 2. A secondary actuator spring 8 is located within the central bore of the housing 2 such that it extends between the inwardly protruding rim 22 and the distal end of the piston shaft 5. The secondary actuator spring 8 allows the setpoint of the device 2 to be set to zero, as the secondary actuator spring 8 provides the additional force required to overcome the frictional force of the actuator piston seal 24 and the weight of the actuator piston 4 itself. This allows the poppet 28 to seal the pilot aperture 30 completely, thus preventing any flow of fluid through the pilot aperture 30 and outlet pilot flow feed 34 and reducing the downstream pressure to zero. The secondary actuator spring 8 may be omitted in embodiments in which a setpoint of zero is not required.

Operation of the actuator device 1 shown in FIGS. 2 and 3 will now be described.

FIG. 2 shows the actuator device 1 with the actuator piston 4 in a resting position. In this position, the volume of control fluid within the actuator chamber 20 is set to a minimum via the control system, meaning that the downwards force exerted by the control fluid pressure on the upper surface of the actuator piston 4 is less than the combined upwards forces of the loading spring 6 and secondary actuator spring 8 acting on the actuator piston 4. As a result, the actuator piston 4 is moved to a distance (e.g. furthest) away from the diaphragm plate 13, thus reducing the compression of the loading spring 6 to a reduced (e.g. minimum) value. The secondary actuator spring 8 acts against the weight of the actuator piston 4 and the frictional force of the actuator seal 24 such that the weight of the actuator piston is not transferred to the diaphragm 14 via the loading spring 6 and diaphragm plate 13 and the loading spring 6 is extended to an increased (e.g. maximum) length. As a result, the downwards force acting on the diaphragm 14 is reduced (e.g. minimised), thus reducing the setpoint of the pilot valve 26 to a reduced (e.g. minimum) value.

In order to increase the setpoint of the pilot valve 26, the inlet solenoid 10 is pulsed open to allow the control fluid to flow into the actuator chamber 20. The pressure of the control fluid in the actuator chamber 20 exerts a force on the upper surface of the actuator piston 4 that is greater than the combined opposing forces of the loading spring 6 and the secondary actuator spring 8. Therefore, the actuator piston 4 is displaced towards the position shown in FIG. 3 and the loading spring 6 and the secondary actuator spring 8 are compressed. The compression of the loading spring 6 increases the downwards force on the diaphragm 14 via the diaphragm plate 13, thus acting to bias the poppet 28 towards an open position. This allows the inlet pilot flow feed 32 to provide a higher pressure through the pilot valve 26, thus increasing the setpoint of the pilot valve 26.

FIG. 3 shows the actuator device 1 with the actuator piston 4 displaced to a position closest to the diaphragm plate 13, thus providing an increased (e.g. maximum) compression of the loading spring 6 and the secondary actuator spring 8. In this position, the volume of control fluid within the actuator chamber 20 is set to a increased (e.g. maximum) value by the control system.

As a result of the increased (e.g. maximum) compression of the loading spring 6, an increased (e.g. maximum) force is exerted by the loading spring 6 on the diaphragm 14 via the diaphragm plate 13, thus increasing the setpoint of the pilot valve 26 to an increased (e.g. highest) value.

In order to reduce the setpoint of the pilot valve 26, the outlet solenoid 12 is pulsed open to allow the control fluid to flow from the actuator chamber 20 through the control fluid outlet feed 18 to atmosphere. As a result, the pressure in the actuator chamber 20 decreases such that the upwards force exerted by the pilot loading spring 6 and the secondary actuator spring 8 on the actuator piston 4 is greater than the opposing force caused by the control fluid pressure. Therefore, the actuator piston 4 is displaced towards the position shown in FIG. 2 and the pilot loading spring 6 is consequently extended, thus reducing the force on the pilot diaphragm 14. As a result, the poppet 27 is biased towards a closed position, shutting the inlet pilot flow feed 32, meaning that a lower downstream pressure is required to close the aperture 30. Therefore, the setpoint of the pilot valve 26 is lowered.

It can be seen from the above that, in at least preferred embodiments, the invention provides an actuator for a pilot regulator capable of setting a control pressure for a pressure regulator or control valve in which the control pressure is set by the compression of a loading spring via a piston. The use of an actuator piston rather than an actuator diaphragm improves the reliability of the actuator as the actuator piston is more resilient to fracture or fatigue. Furthermore, the larger stroke size of the piston gives a greater range of control of the setpoint prior art actuators.

Although the actuator in FIGS. 2 and 3 has been shown in use with a particular pilot valve, those skilled in the art will recognise that the actuator of the present invention may be used with a variety of different pilot valves. In particular, the pilot valve may operate in a different arrangement, e.g. such that the valve is closed when the fluid pressure in the actuator chamber is increased and opened when the fluid pressure in the actuator chamber is decreased.

The invention claimed is:

1. An actuator for a pilot valve, the actuator comprising:
a housing;
a piston movably mounted in the housing;
an actuator chamber defined between the piston and the housing;
a control fluid feed for introducing a fluid into the actuator chamber to selectively control a fluid pressure in the actuator chamber, wherein the piston is arranged to be acted on by the fluid pressure in the actuator chamber;
an actuation member for acting on the pilot valve;
a loading spring between the piston and the actuation member, wherein the loading spring is arranged to bias the piston against the fluid pressure in the actuator chamber; and
a secondary spring that extends between the housing and the piston, wherein the secondary spring is arranged to bias the piston against the fluid pressure in the actuator chamber;
wherein the control fluid feed is arranged to control the fluid pressure in the actuator chamber so the fluid pressure acts on the piston against the bias of the loading spring to control a biasing force exerted by the loading spring on the actuation member for actuating the pilot valve.

2. An actuator for a pilot valve, the actuator comprising:
a housing;
a piston movably mounted in the housing, wherein:
the piston comprises a radially-extending flange;
the radially-extending flange is arranged to engage with a corresponding shoulder, wherein the shoulder is defined by the housing; and
the shoulder acts as a stop for the piston when the piston is moved into contact with the shoulder;
a seal, arranged between the piston and the housing, wherein the seal is arranged within a groove defined by the radially-extending flange of the piston;
an actuator chamber defined between the piston and the housing;
a control fluid feed for introducing a fluid into the actuator chamber to selectively control a fluid pressure in the actuator chamber, wherein the piston is arranged to be acted on by the fluid pressure in the actuator chamber;
an actuation member for acting on the pilot valve; and
a loading spring between the piston and the actuation member, wherein the loading spring is arranged to bias the piston against the fluid pressure in the actuator chamber;

wherein the control fluid feed is arranged to control the fluid pressure in the actuator chamber so the fluid pressure acts on the piston against the bias of the loading spring to control a biasing force exerted by the loading spring on the actuation member for actuating the pilot valve.

3. The actuator as claimed in claim 2, wherein the piston comprises a piston shaft having a recess defined therein that receives the loading spring.

4. The actuator as claimed in claim 2, wherein the control fluid feed is fluidly connected to a fluid source for supplying the fluid into the actuator chamber.

5. The actuator as claimed in claim 2, wherein the control fluid feed comprises an inlet conduit and an outlet conduit, wherein the inlet conduit and the outlet conduit are integrally formed in the housing.

6. The actuator as claimed in claim 2, wherein the control fluid feed comprises an inlet valve for controlling the flow of fluid into the actuator chamber and an outlet valve for controlling the flow of fluid out of the actuator chamber.

7. The actuator as claimed in claim 6, wherein the inlet valve and the outlet valve are arranged to seal the actuation chamber.

8. The actuator as claimed in claim 6, wherein the inlet valve comprises an inlet solenoid valve and the outlet valve comprises an outlet solenoid valve.

9. The actuator as claimed in claim 6, wherein the inlet valve and the outlet valve are directly mounted on the housing.

10. The actuator as claimed in claim 6, wherein the inlet valve and the outlet valve are biased closed.

11. The actuator as claimed in claim 2, wherein the actuator comprises a secondary spring that extends between the housing and the piston, wherein the secondary spring is arranged to bias the piston against the fluid pressure in the actuator chamber.

12. The actuator as claimed in claim 11, wherein the secondary spring surrounds the loading spring.

13. A system for controlling a setpoint of a pilot valve, wherein the system comprises:
   a pilot valve and an actuator as claimed in claim 1.

* * * * *